Patented Oct. 27, 1953

2,657,240

UNITED STATES PATENT OFFICE 2,657,240

PREPARATION OF DIAMINES

Robert Everett Foster, New Castle, Del., and Herman E. Schroeder, Kennett Square, Pa., assignors to E. I. du Pont de Nemours & Company, Wilmington, Del., a corporation of Delaware No Drawing. Application December 29, 1951, Serial No. 264,268

15 Claims. (Cl. 260—583)

This invention relates to the preparation of amines and, more particularly, to the preparation of diamines. The present application is a continuation-in-part of applicants' copending application Serial No. 189,302, filed October 9, 1950.

The advent of nylon has created a large demand for diamines and a number of processes for the preparation of these compounds, particularly hexamethylenediamine, have been developed. For the most part these processes start with readily available intermediates, such as phenol, furfural, or butadiene, but involve a large number of steps. To illustrate, the phenol route involves hydrogenation to cyclohexanol, oxidation to cyclohexanone, further oxidation to adipic acid, conversion to adiponitrile and hydrogenation to hexamethylenediamine. A simpler process starting with an equally accessible intermediate is therefore an important goal.

An object of the present invention is to provide a new and advantageous process of preparing amines. A further and more particular object is to provide a process of preparing hexamethylenediamines from readily accessible starting materials. Other objects will be apparent from the description of the invention given hereinafter.

The above objects are accomplished according to the present invention by reacting a cyclohexene-ozone-alcohol reaction product with a compound of the formula

wherein R and R' are hydrogen or monovalent hydrocarbon radicals, and with hydrogen in the presence of a hydrogenation catalyst. The invention comprises more specifically the preparation of hexamethylenediamine by reacting ozone with cyclohexene dissolved in an alcohol, and then reacting the resulting reaction product with ammonia and hydrogen in the presence of a hydrogenation catalyst.

A preferred and specific form of the present invention comprises the following steps: (1) reacting a solution of cyclohexene in a lower boiling saturated aliphatic alcohol with ozone at $-80°$ C. to $+20°$ C. until the major portion of the cyclohexene has reacted with ozone; (2) reacting the resulting mixture with an excess of ammonia under at least autogenous pressure and at a temperature of $20°$ C. to $100°$ C. in the absence of hydrogen for a short time; and (3) thereafter reacting the resulting reaction mixture with hydrogen at a temperature of $50°$ C. to $150°$ C. and a pressure of 50 to 1000 atmospheres in the presence of a nickel or cobalt hydrogenation catalyst.

When cyclohexene is reacted with ozone in the presence of a lower saturated aliphatic alcohol, such as methanol, ethanol or the various propyl and butyl alcohols, where the alcohol may be part or all of the solvent medium, the reaction involves direct participation of the alcohol, and the product contains alcohol in combination with cyclohexene and ozone. Thus, products isolated by removing the excess alcohol and other solvents at room temperature under high vacuum are obtained in weight yields higher than the theoretical amounts based only on cyclohexene and absorbed ozone. The products are very viscous syrups which form glassy solids when cooled with solid carbon dioxide but are not crystalline at ordinary temperatures. In a typical example in which methanol was used as solvent, the ozonolysis product obtained after removing all traces of solvent methanol in a high vacuum, weighed 18 percent more than the theoretical amount calculated on the basis of only cyclohexene and absorbed ozone. Analytical data for representative cyclohexene-ozone-alcohol products are given in the following table:

| Sample No. | Alcohol used as Solvent | Mol. Wt. of Prod. | Percent Carbon | Percent Hydrogen | Percent Hydroxyl | Percent Alkoxyl |
|---|---|---|---|---|---|---|
| | | | | | | (OCH$_3$) |
| 1 | Methanol | | 51.65 | 9.66 | 1.09 | 39.77 |
| | | | 51.28 | 9.51 | 1.10 | 39.65 |
| 2 | do | 208 | 52.06 | 9.17 | 2.13 | 19.81 |
| | | 204 | 52.35 | 8.97 | 2.42 | 19.71 |
| | | | 52.18 | 9.03 | | |
| | | | | | | [OCH(CH$_3$)$_2$] |
| 3 | Isopropanol | 237 | 54.54 | 9.27 | 5.62 | 20.8 |
| | | 259 | 54.25 | 9.28 | 5.79 | 21.2 |

These data show a substantial but variable alkoxy content. The products also contain active oxygen (peroxide). Iodometric titration of sample 2, for example, showed 10% peroxide oxygen. In addition, infrared absorption curves show the presence of carbonyl groups. Samples 1 and 2 show a wide variation of alkoxy content which can be related to the conditions of preparation: Sample 1 was isolated from a cyclohexene-ozone-methanol reaction mixture which had been allowed to stand at room temperature for several days prior to the removal of excess methanol, while sample 2 was obtained from a similar preparation which had been refrigerated with solid carbon dioxide until the time of solvent removal.

The foregoing observations support the conclusion that the reaction product of cyclohexene and ozone in alcohol media is not a simple cyclohexene ozonide but a more complex product resulting from the participation of the alcohol in the reaction. They also indicate that the products are probably mixtures of components containing various levels of alkoxy substitution depending upon the conditions of preparation. Although the structure of the products is not known, it is believed they are mixtures of alkoxy peroxides or alkoxy hydroperoxides. For convenience the products will be referred to as "ozonolysis products" or as "the ozonolysis product."

A convenient way to carry out the new process of this invention as applied to the preparation of hexamethylenediamine is as follows: Cyclohexene is dissolved in at least a molar equivalent of a lower boiling saturated aliphatic alcohol and cooled to below 20° C., preferably below 0° C. Ozone in the form of an oxygen-ozone mixture is then introduced into the cold cyclohexene solution until absorption ceases or until a substantial part of the cyclohexene has reacted with the ozone. In general, the reaction will be continued until from 20 to 60 parts of ozone per 100 parts of cyclohexene has been absorbed. To the solution of cyclohexene-ozone-alcohol reaction product thus formed is added an excess of liquid ammonia (at least two mols per mol of cyclohexene reacted) and a hydrogenating catalyst. This mixture is agitated, preferably in a closed vessel, at ordinary or moderately elevated temperatures, e. g., 20° C. to 100° C., for a few minutes. This operation can be carried out in the absence of a hydrogenation catalyst but it is generally desirable to add the catalyst at the beginning since this avoids the necessity of opening the vessel to introduce catalyst for the subsequent hydrogenation reaction. Hydrogen is then injected into the reaction vessel, preferably under a pressure of at least 50 atmospheres, and the reaction is continued at approximately the same temperature with continued agitation until absorption of hydrogen ceases. The reaction vessel is then cooled, and the contents are removed and filtered in an inert atmosphere to remove catalyst. The filtrate is subjected to fractional distillation to separate the alcohol and hexamethylenediamine. If desired, the diamine can be separated from the filtrate as a salt by treatment with acid.

Hexamethylenediamine can be obtained in essentially equal yields by reacting the cyclohexene-ozone-alcohol reaction product simultaneously with hydrogen and ammonia, but there is less tendency for tar formation when the ozonolysis product is reacted with ammonia prior to hydrogenation as described above. The prior reaction with ammonia is preferably carried out for a period of one minute to three hours; longer periods result in the formation of products which give lower yields of hexamethylenediamine on subsequent hydrogenation. Apparently, the ammonia reacts with the cyclohexene-ozone-alcohol reaction product to form an intermediate nitrogen-containing compound which is then reduced to the diamine. Preferably, a large excess of ammonia, e. g., of the order of 5–50 mols per mol of cyclohexene is used.

The following examples, in which all parts are by weight unless otherwise stated, illustrate specific embodiments of the invention.

EXAMPLE I

A. *Preparation of cyclohexene-ozone-methanol reaction product*

A solution of 60 parts of cyclohexene in 400 parts of methanol is cooled by means of a solid carbon dioxide-acetone bath. A stream of oxygen containing 3% of ozone is bubbled through this solution for a total of 8 hours. The gain in weight due to absorption of ozone is 31 parts, and analysis of an aliquot part (by removing unreacted methanol and cyclohexene in vacuo) indicates the presence of 91.6 parts of ozonolysis product.

B. *Conversion to diamine*

Approximately 15% of the foregoing methanol solution of cyclohexene-ozone-methanol reaction product is placed in a stainless steel pressure bomb along with two parts of alloy-skeleton cobalt. 40 parts of liquid ammonia are added, and the bomb is closed and heated with agitation at 50° C. for 3 hours. Hydrogen is then injected to give a total pressure of 200 atmospheres, and the agitation and heating are continued for 5 hours. Reduction in pressure amounts to about 200 lb./sq. in. The reaction mixture is filtered under nitrogen. The solvent is removed from the filtrate by distillation at atmospheric pressure and the residue is distilled in vacuo. This yields about 3 parts of crude hexamethylenediamine boiling at 76–90° C. at 3–5 mm.

The hexamethylenediamine is identified by heating a small part of the fraction boiling at 76–90° C./3–5 mm. with picric acid in alcoholic solution. The resultant picrate melts at 222–224° C. and shows no depression in melting point when mixed with an authentic sample of hexamethylenediamine picrate. A further portion of the crude hexamethylenediamine fraction is treated with benzoyl chloride and aqueous alkali. This gives the dibenzamide of hexamethylenediamine, melting point 156–157° C., alone or when mixed with the dibenzamide of an authentic sample of hexamethylenediamine. Still another portion of the crude hexamethylenediamine is converted to the p-toluenesulfonamide, melting at 153–156° C., which is identical with the known melting point of p-toluene-sulfonamide of hexamethylenediamine.

EXAMPLE II

Part B of Example I is repeated except that 50 parts of ammonia are used and the reaction is continued for 2 hours prior to the injection of hydrogen. On working up the reaction mixture, 3.3 parts of crude hexamethylenediamine boiling at 86–90° C./4–5 mm. is obtained and identified by conversion to the benzamide.

EXAMPLE III

A solution of 57.0 parts of cyclohexene dissolved in 400 parts of isopropyl alcohol is treated at —78° C. with oxygen containing 3% ozone for 5 hours. The increase in weight due to the absorption of ozone is 16 parts.

The above solution is charged into a pressure bomb along with 80 parts of additional isopropyl alcohol and 50 parts of alloy skeleton cobalt. The bomb is pressured with 200 parts of ammonia and heated at 60° C. for 3 hours. The bomb is then pressured with hydrogen to 2000 lbs./sq. in. and heated at 60° C. for 2 hours. The reaction mixture is removed, filtered, and fractionally distilled. This gives 7 parts of hexamethylenediamine, which boiled at 60–65° C./2 mm. and crytallized on cooling.

EXAMPLE IV

A solution of 33 parts of cyclohexene dissolved in about 400 parts of isopropyl alcohol is treated for five hours, while cooled in a solid carbon dioxide-acetone bath, with oxygen containing 3% of ozone. The increase in weight due to absorption of ozone is 16 parts.

The above solution is charged into a pressure bomb along with 40 parts of additional isopropyl alcohol and 20 parts of alloy skeleton cobalt which has been washed with an isopropyl alcohol solution of cyclohexene-ozone-isopropyl alcohol reaction product. The bomb is pressured with 100 parts of ammonia and sufficient hydrogen to bring the pressure up to 1000 lb./sq. in. The bomb is then heated, with agitation, to 60° C., whereupon the pressure drops to about 900 lb./sq. in. Additional hydrogen is introduced to bring the pressure to 2000 lb./sq. in., and the bomb is heated at 60° C. to 80° C. for two hours. The reaction mixture is then removed, filtered, and the filtrate fractionally distilled. This gives 3 parts of hexamethylenediamine, boiling at 46° C.–56° C./1 mm., which crystallizes on cooling, and 8 parts of an oxygen-containing amine, believed to be a monoamine, boiling at 65° C./1 mm. Analysis of the latter product indicates that it has a molecular weight of about 160 and contains nine carbon atoms.

EXAMPLE V

A solution of 50 parts of cyclohexene in 320 parts of isopropyl alcohol is treated with 3% ozone in oxygen for 7.5 hours at —80° C. A portion (about 125 parts) of this solution, containing 0.13 mol of ozonolysis product, is injected over a 4-hour period into a stainless steel shaker tube containing 100 parts of 25% aqueous methylamine, 25 parts of reduced cobalt oxide catalyst (8–14 mesh), and hydrogen to give a total pressure of 200–375 atmospheres. The reaction tube is agitated and heated at 50° C. during this period and for an additional 4 hours. The solvents are removed under 15–20 mm. pressure and the residue is distilled. The liquid product, which consists of 27.5 parts, distills from 35–54° C. (1 mm.), leaving 1.9 parts of undistillable residue. The distillate has a neutral equivalent of 268 and its basic constituent is identified as N,N'-dimethylhexamethylenediamine by conversion to the benzenesulfonyl derivative as described below. The yield of diamine, based on the neutral equivalent, is 38%.

Treatment of the distillate with benzenesulfonyl chloride in the presence of aqueous sodium hydroxide results in the formation of an insoluble, solid derivative indicating the presence of a secondary amine. On recrystallization from glacial acetic acid this derivative melts at 184–186° C., and the melting point is not depressed on admixture of the derivative with an authentic sample of the benzenesulfonyl derivative of N,N'-dimethylhexamethylenediamine.

EXAMPLE VI

An isopropyl alcohol solution of cyclohexene ozonolysis product is prepared by treating an isopropyl alcohol solution of cyclohexene with ozone until iodometric titration indicates the presence of 0.109 mol of ozonolysis product per 100 parts of solution, assuming one mol of combined ozone (as peroxide) per mol of ozonolysis product. One hundred twenty-five parts of this solution is injected over a 5-hour period into a stainless steel pressure vessel containing 50 parts of ammonia, 15 parts of Raney nickel catalyst, and sufficient hydrogen to result in a total pressure of 250 atmospheres. The temperature is maintained at 60° C., and the pressure vessel is agitated during the injection period and for 4 hours additional. The pressure rises to 490 atm. during this time. The catalyst is separated by filtration and the solvent is removed from the filtrate by distillation under slightly reduced pressure. The product (3.5 parts) distilling at 70–95° C./2 mm. is basic and has a neutral equivalent of 92. On the basis of these data, the roduct contains 2.2 parts of hexamethylenediamine, equivalent to a yield of about 14% based on cyclohexene ozonolysis product.

EXAMPLE VII

An isopropyl alcohol solution of cyclohexene ozonolysis product containing 1.25 mol/liter of the ozonolysis product, is mixed with ammonia and hydrogen, and passed through a vertical reaction tube containing reduced cobalt oxide catalyst. The reactants are introduced at the bottom of the tube at the following rates: solution of ozonolysis product, 190 parts per hour; ammonia, 90 parts per hour; and hydrogen, one liter per hour. The dimensions of the reaction tube (length 4 feet, inside diameter 2½ inches) are such that the time of contact of the reactants in the tube is approximately one hour. The temperature in the tube is maintained at 50° C. and the pressure at 400 atmospheres. The reaction product is continuously withdrawn from the top of the tube. Approximately 380 parts of the isopropyl alcohol solution of the ozonolysis product is passed through the tube every two hours. Analysis of the product collected during two hours' run shows that it contains 16.4 parts hexamethylenediamine, which corresponds to a 29.4% yield based on the original ozonolysis product.

In a similar run carried out at 125° C. and at a higher rate of flow the yield of hexamethylenediamine was 29.6%; and in another run carried out at 175° C., the yield was 7.7%.

It will be understood that the above examples are merely illustrative and that the present invention broadly comprises the preparation of amines by reacting cyclohexene ozone-alcohol reaction products with compounds of the formula

wherein R and R' are hydrogen or monovalent hydrocarbon radicals, and with hydrogen in the presence of a hydrogenation catalyst.

The cyclohexene-ozone-alcohol reaction product, as previously indicated, can be prepared by reacting an alcohol solution of cyclohexene with ozone. Suitable alcohols in addition to those already mentioned are ethyl, propyl, butyl, isobutyl, amyl, hexyl, cyclohexyl, and benzyl. The preferred alcohols are the lower-boiling alcohols of 1 to 4 carbon atoms. It is further desirable that the alcohol be free from non-benzenoid (olefinic or acetylenic) unsaturation since otherwise side reactions occur. Sufficient alcohol is used to keep the ozonolysis product in solution. In general, the amount of alcohol used will be from 2 to 15 parts per part of cyclohexene.

Ammonia is most frequently used as the

compound inasmuch as it leads to the formation of the diprimary diamine which is in greater demand. But the reaction can be carried out with primary or secondary amines in general, e. g., methylamine, dimethylamine, ethylamine, diethylamine, hexylamine, cyclohexylamine, aniline and benzylamine, to synthesize various desired amines. The use of a primary amine in the reaction leads to the formation of a secondary amine, and the use of a secondary amine leads to the formation of a tertiary amine.

A hydrogenation catalyst is required for the reaction with hydrogen. Cobalt and nickel in various reduced forms commonly used as hydrogenation catalysts, have given the best results. The catalysts can be supported on inactive materials, such as kieselguhr, silica, or carbon. Since some catalysts are more reactive than others, the temperature selected in the hydrogenation will be influenced to some extent by the catalyst used. Generally, from 0.5% to 20% of catalyst based on the weight of the cyclohexene-ozone-alcohol reaction product is employed, but larger amounts may be used as indicated in Example V.

The hydrogenation can be carried out at room temperature (20° C.) but temperatures of the order of 50° C. to 150° C. are preferred. The temperature should be kept below the decomposition temperature of the amine being formed and it is not desirable to go above 200° C.

The hydrogenation is effected under superatmospheric pressure, preferably a pressure of at least 50 atmospheres being used. In normal practice the pressure would not exceed 3000 atmospheres and usually not 1000 atmospheres, but, if desired, any pressure the apparatus is capable of withstanding, can be used. When the hydrogen and ammonia are introduced substantially simultaneously, the temperature will be maintained, preferably, at 20° C. or higher, and a pressure of, preferably, at least 50 atmospheres maintained. Hydrogenation is continued, of course, until formation of the amine has occurred; for maximum conversion to amine the pressure drop in the reaction vessel is observed, the reaction being substantially complete when the pressure drop ceases, this normally occurring within a period of several hours as shown in the examples.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing an amine which comprises reacting a cyclohexene-ozone-alcohol reaction product with a compound of the formula

wherein R and R' are from the group consisting of hydrogen and monovalent hydrocarbon radicals of 1 to 7 carbon atoms, inclusive, and with hydrogen in the presence of a hydrogenation catalyst.

2. Process as set forth in claim 1 wherein said reaction product is a cyclohexene-ozone-methanol reaction product.

3. Process as set forth in claim 1 wherein said reaction product is a cyclohexene-ozone-isopropyl alcohol reaction product.

4. Process of preparing a diamine which comprises reacting a cyclohexene-ozone-alcohol reaction product with a compound of the formula

wherein R and R' are from the group consisting of hydrogen and monovalent hydrocarbon radicals of 1 to 7 carbon atoms, inclusive, present in a proportion of at least two mols per mol of cyclohexene reacted, and with hydrogen in the presence of a hydrogenation catalyst.

5. Process as set forth in claim 2 wherein the reaction is carried out at a temperature of at least 20° C. and a pressure of at least 50 atmospheres.

6. Process of preparing a diamine which comprises reacting a cyclohexene-ozone-lower saturated aliphatic alcohol reaction product with a compound of the formula

wherein R and R' are from the group consisting of hydrogen and monovalent hydrocarbon radicals of 1 to 7 carbon atoms, inclusive, present in a proportion of at least 2 mols per mol of cyclohexene reacted, in the absence of hydrogen and thereafter reacting the resulting reaction mixture with hydrogen in the presence of a catalyst from the group consisting of cobalt and nickel hydrogenation catalysts.

7. Process of preparing a diamine which comprises reacting a cyclohexene-ozone-lower saturated aliphatic alcohol reaction product dissolved in a lower saturated aliphatic alcohol, with a compound of the formula

wherein R and R' are from the group consisting of hydrogen and monovalent hydrocarbon radicals of 1 to 7 carbon atoms, inclusive, under at least autogenous pressure and at a temperature of at least 20° C. in the absence of hydrogen and thereafter reacting the resulting reaction mixture with hydrogen at a temperature of at least 20° C. and a pressure of at least 50 atmospheres in the presence of a catalyst from the group consisting of cobalt and nickel hydrogenation catalysts.

8. Process of preparing hexamethylenediamine which comprises reacting a cyclohexene-ozone-alcohol reaction product with ammonia and hydrogen in the presence of a hydrogenation catalyst.

9. Process of preparing hexamethylenediamine which comprises reacting a cyclohexene-ozone-alcohol reaction product with ammonia present in a proportion of at least 2 mols per mol of cyclohexene reacted, and hydrogen in the presence of a catalyst from the group consisting of cobalt and nickel hydrogenation catalysts.

10. Process as set forth in claim 7 wherein the reaction is carried out at a temperature of at least 20° C. and a pressure of at least 50 atmospheres.

11. Process of perparing hexamethylenediamine which comprises reacting a cyclohexene-ozone-lower saturated aliphatic alcohol reaction product dissolved in a lower saturated aliphatic alcohol, with ammonia present in a proportion of 5 to 50 mols per mol of cyclohexene reacted, and hydrogen at a temperature of 20° C. to 200° C. and a pressure of 50 to 1000 atmospheres in the presence of a catalyst from the group consisting of cobalt and nickel hydrogenation catalysts.

12. Process as set forth in claim 9 wherein said reaction product is a cyclohexene-ozone-methanol reaction product dissolved in methanol.

13. Process as set forth in claim 9 wherein said reaction product is a cyclohexene-ozone-isopropyl alcohol reaction product dissolved in isopropyl alcohol.

14. Process of preparing hexamethylenediamine which comprises reacting a cyclohexene-ozone-lower saturated aliphatic alcohol reaction product with ammonia present in a proportion of at least two mols per mol of cyclohexene ozonide, in the absence of hydrogen and thereafter reacting the resulting reaction mixture with hydrogen in the presence of a catalyst from the group consisting of cobalt and nickel hydrogenation catalysts.

15. Process of preparing hexamethylenedimaine which comprises reacting a cyclohexene-ozone-lower saturated aliphatic alcohol reaction product with ammonia present in a proportion of at least 2 mols per mol of cyclohexene reacted, under at least autogenous pressure and at a temperature of at least 20° C. in the absence of hydrogen and thereafter reacting the resulting reaction mixture with hydrogen at a temperature of at least 20° C. and a pressure of at least 50 atmospheres in the presence of a catalyst from the group consisting of cobalt and nickel hydrogenation catalysts.

ROBERT EVERETT FOSTER.
HERMAN E. SCHROEDER.

No references cited.